United States Patent
Hapsari et al.

(10) Patent No.: US 9,769,649 B2
(45) Date of Patent: Sep. 19, 2017

(54) MOBILE STATION

(71) Applicant: NTT DOCOMO, INC., Tokyo (JP)

(72) Inventors: Wuri Andarmawanti Hapsari, Tokyo (JP); Itsuma Tanaka, Tokyo (JP); Keisuke Suzuki, Tokyo (JP); Kenichiro Aoyagi, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 260 days.

(21) Appl. No.: 14/399,552

(22) PCT Filed: May 7, 2013

(86) PCT No.: PCT/JP2013/062833
§ 371 (c)(1),
(2) Date: Nov. 7, 2014

(87) PCT Pub. No.: WO2013/168700
PCT Pub. Date: Nov. 14, 2013

(65) Prior Publication Data
US 2015/0111556 A1    Apr. 23, 2015

(30) Foreign Application Priority Data

May 7, 2012 (JP) .................. 2012-106010

(51) Int. Cl.
*H04W 8/22* (2009.01)
*H04W 48/02* (2009.01)

(52) U.S. Cl.
CPC ............. *H04W 8/22* (2013.01); *H04W 48/02* (2013.01)

(58) Field of Classification Search
CPC ....... H04W 12/08; H04W 4/22; H04W 60/00; H04W 84/045; H04W 48/02; H04W 8/22
See application file for complete search history.

(56) References Cited

U.S. PATENT DOCUMENTS

| 9,167,506 B2* | 10/2015 | Faccin ................. H04W 48/08 |
| 2012/0015620 A1 | 1/2012 | Ueda et al. | |
| 2013/0035064 A1* | 2/2013 | Balachandran ....... H04W 48/02 455/411 |

FOREIGN PATENT DOCUMENTS

| JP | 2001-078260 A | 3/2001 |
| JP | 2011-015184 A | 1/2011 |

(Continued)

OTHER PUBLICATIONS

International Search Report issued in PCT/JP2013/062833 mailed on Jul. 16, 2013 (3 pages).

(Continued)

*Primary Examiner* — Liton Miah
(74) *Attorney, Agent, or Firm* — Osha Liang LLP

(57) ABSTRACT

To provide restriction control independently from the packet call and the voice call. A mobile station UE according to the present invention is configured to perform SSAC for determining whether or not to permit transmission of an IMS-related originating signal according to a SSAC restriction information broadcasted. IMS function 13 is configured to notify NS function 12 of an originating request containing an identifier indicating the IMS-related originating signal, when determining to permit transmission of the IMS-related originating signal. The NAS function 12 is configured to notify AS function 11 of the originating request containing the identifier indicating the IMS-related originating signal. The AS function 11 is configured not to perform ACB for determining whether or not to permit transmission of the INS-related originating signal, in response to the notified originating request containing the identifier.

4 Claims, 17 Drawing Sheets

(56) References Cited

FOREIGN PATENT DOCUMENTS

| JP | 2011-151843 A | 8/2011 |
|---|---|---|
| WO | 2010/119728 A1 | 10/2010 |

OTHER PUBLICATIONS

3GPP TS 36.331 V9.10.0; "3rd Generation Partnership Project; Technical Specification Group Radio Access Network; Evolved Universal Terrestrial Radio Access (E-UTRA); Radio Resource Control (RRC); Protocol specification (Release 9)"; Mar. 2012 (255 pages).

3GPP TR 22.806 V0.2.0; "3rd Generation Partnership Project; Technical Specification Group Services and System Aspects; Study on Application Specific Congestion Control for Data Communication (Release 12)"; Nov. 2012 (8 pages).

Written Opinion of the International Searching Authority issued in PCT/JP2013/062833 mailed on Jul. 16, 2013 (3 pages).

NTT Docomo et al.; "Service Specific Access Control: Way Forward"; 3GPP TSG CT WG1 Meeting #59, C1-092539; Los Angeles, USA; Jun. 22-26, 2009 (3 pages).

NTT Docomo, Inc.; "Resolving open issues of SSAC"; 3GPP TSG-RAN WG2 #68bis, Tdoc-R2-100592; Valencia, Spain; Jan. 18-22, 2010 (4 pages).

NTT Docomo; "Discussion on Technical Realisation of SSAC—Selection of Alternatives"; 3GPP TSG CT WG1 Meeting #60, C1-093401; Sevilla, Spain; Aug. 24-28, 2009 (3 pages).

3GPP TS 36.331 V10.5.0; "3rd Generation Partnership Project; Technical Specification Group Radio Access Network; Evolved Universal Terrestrial Radio Access (E-UTRA); Radio Resource Control (RRC); Protocol specification (Release 10)"; Mar. 2012 (302 pages).

Partial Supplementary Search Report issued in corresponding European Patent Application No. 13788638.8, mailed Jan. 5, 2016 (8 pages).

Extended Search Report issued in corresponding European Application No. 13788638.8, mailed Apr. 21, 2016 (17 pages).

* cited by examiner

FIG. 5

SystemInformationBlockType2 information element

```
-- ASN1START

SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig                                OPTIONAL,    -- Need OP
        ac-BarringForMO-Data               AC-BarringConfig                                OPTIONAL,    -- Need OP
    }                                                                                      OPTIONAL,    -- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA                                OPTIONAL,    -- Need OP
        ul-Bandwidth                       ENUMERATED {n6, n15, n25, n50, n75, n100)       OPTIONAL,    -- Need OP
    },
    additionalSpectrumEmission         AdditionalSpectrumEmission
    mbsfn-SubframeConfigList           MBSFN-SubframeConfigList                            OPTIONAL,    -- Need OR
    timeAlignmentTimerCommon           TimeAlignmentTimer,
    ...,
    lateNonCriticalExtension           OCTET STRING                                        OPTIONAL,    -- Need OP
    [[  ssac-BarringForMMTEL-Voice-r9      AC-BarringConfig                                OPTIONAL,    -- Need OP
        ssac-BarringForMMTEL-Video-r9      AC-BarringConfig                                OPTIONAL,    -- Need OP
    ]],
    [[  ac-BarringForCSFB-r10              AC-BarringConfig                                OPTIONAL     -- Need OP
    ]]
    [[  ssac-BarringForIMS-r11             AC-BarringConfig                                OPTIONAL     -- Need OP
    ]]
}

AC-BarringConfig ::=    SEQUENCE {
    ac-BarringFactor        ENUMERATED {
                                p00, p05, p10, p15, p20, p25, p30, p40,
                                p50, p60, p70, p75, p80, p85, p90, p95},
    ac-BarringTime          ENUMERATED {s4, s8, s16, s32, s64, s128, s256, s512},
    ac-BarringForSpecialAC  BIT STRING (SIZE(5))
}

MBSFN-SubframeConfigList ::=    SEQUENCE (SIZE (1..maxMBSFN-Allocations)) OF MBSFN-SubframeConfig

-- ASN1STOP
```

FIG. 6

| SystemInformationBlockType2 field descriptions |
|---|
| ac-BarringFactor <br> If the random number drawn by the UE is lower than this value, access is allowed. Otherwise the access is barred. The values are interpreted in the range [0,1]: p00 = 0, p05 = 0.05, p10 = 0.10,...,p95 = 0.95. Values other than p00 can only be set if all bits of the corresponding *ac-BarringForSpecialAC* are set to 0. |
| ac-BarringForCSFB <br> Access class barring for mobile originating CS fallback. |
| ac-BarringForEmergency <br> Access class barring for AC 10. |
| ac-BarringForMO-Data <br> Access class barring for mobile originating calls. |
| ac-BarringForMO-Signalling <br> Access class barring for mobile originating signalling. |
| ac-BarringForSpecialAC <br> Access class barring for AC 11-15. The first/ leftmost bit is for AC 11, the second bit is for AC 12, and so on. |
| ac-BarringTime <br> Mean access barring time value in seconds. |
| additionalSpectrumEmission <br> The UE requirements related to IE *AdditionalSpectrumEmission* are defined in TS 36.101 [42, table 6.2.4.1]. |
| mbsfn-SubframeConfigList <br> Defines the subframes that are reserved for MBSFN in downlink. |
| ssac-BarringForMMTEL-Video <br> Service specific access class barring for MMTEL video originating calls. |
| ssac-BarringForMMTEL-Voice <br> Service specific access class barring for MMTEL voice originating calls. |
| ssac-BarringforIMS <br> Service specific access class barring for originating calls triggered by IMS based applications. |
| ul-Bandwidth <br> Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq <br> For FDD: If absent, the (default) value determined from the default TX-RX frequency separation defined in TS 36.101 [42, table 5.7.3-1] applies. <br> For TDD: This parameter is absent and it is equal to the downlink frequency. |

FIG. 7

SystemInformationBlockType2 information element

```
-- ASN1START

SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig                OPTIONAL,   -- Need OP
        ac-BarringForMO-Data                AC-BarringConfig                OPTIONAL,   -- Need OP
    }                                                                       OPTIONAL,   -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA                                OPTIONAL,   -- Need OP
        ul-Bandwidth                        ENUMERATED {n6, n15, n25, n50, n75, n100}       OPTIONAL,   -- Need OP
    },
    additionalSpectrumEmission          AdditionalSpectrumEmission
    mbsfn-SubframeConfigList            MBSFN-SubframeConfigList                            OPTIONAL,   -- Need OR
    timeAlignmentTimerCommon            TimeAlignmentTimer,
    ...,
    lateNonCriticalExtension            OCTET STRING                                        OPTIONAL,   -- Need OP
    [[ ssac-BarringForMMTEL-Voice-r9    AC-BarringConfig                                    OPTIONAL,   -- Need OP
       ssac-BarringForMMTEL-Video-r9    AC-BarringConfig                                    OPTIONAL,   -- Need OP
    ]],
    [[ ac-BarringForCSFB-r10            AC-BarringConfig                                    OPTIONAL    -- Need OP
    ]],
    [[ ssac-BarringForIMS-r11           AC-BarringConfig                                    OPTIONAL    -- Need OP
    ]]
}

AC-BarringConfig ::=                SEQUENCE {
    ac-BarringFactor                    ENUMERATED {
                                            p00, p05, p10, p15, p20, p25, p30, p40,
                                            p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE(5))
}

MBSFN-SubframeConfigList ::=        SEQUENCE (SIZE (1..maxMBSFN-Allocations)) OF MBSFN-SubframeConfig

-- ASN1STOP
```

FIG. 8

| SystemInformationBlockType2 field descriptions |
|---|
| ac-BarringFactor <br> If the random number drawn by the UE is lower than this value, access is allowed. Otherwise the access is barred. The values are interpreted in the range [],1): p00 = 0, p05 = 0.05, p10 = 0.10,...,p95 = 0.95. Values other than p00 can only be set if all bits of the corresponding ac-BarringForSpecialAC are set to 0. |
| ac-BarringForCSFB <br> Access class barring for mobile originating CS fallback. |
| ac-BarringForEmergency <br> Access class barring for AC 10. |
| ac-BarringForMO-Data <br> Access class barring for mobile originating calls. |
| ac-BarringForMO-Signalling <br> Access class barring for mobile originating signalling. |
| ac-BarringForSpecialAC <br> Access class barring for AC 11-15. The first/leftmost bit is for AC 11, the second bit is for AC 12, and so on. |
| ac-BarringTime <br> Mean access barring time value in seconds. |
| additionalSpectrumEmission <br> The UE requirements related to IE AdditionalSpectrumEmission are defined in TS 36.101 [42, table 6.2.4.1]. |
| mbsfn-SubframeConfigList <br> Defines the subframes that are reserved for MBSFN in downlink. |
| ssac-BarringForMMTEL-Video <br> Service specific access class barring for MMTEL video originating calls. This IE can be used also for service specific access class barring of IMS based applications. (IMS粒度) |
| ssac-BarringForMMTEL-Voice <br> Service specific access class barring for MMTEL voice originating calls. This IE can be used also for service specific access class barring of IMS based applications. (IMS粒度) |
| ssac-BarringforIMS <br> Service specific access class barring for originating calls triggered by IMS based applications. |
| ul-Bandwidth <br> Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq <br> For FDD: If absent, the (default) value determined from the default TX-RX frequency separation defined in TS 36.101 [42, table 5.7.3-1] applies. <br> For TDD: This parameter is absent and it is equal to the downlink frequency. |

FIG. 10

SystemInformationBlockType2 information element

```
-- ASN1START

SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig            OPTIONAL,    -- Need OP
        ac-BarringForMO-Data                AC-BarringConfig            OPTIONAL,    -- Need OP
    }                                                                                -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA                            OPTIONAL,    -- Need OP
        ul-Bandwidth                        ENUMERATED {n6, n15, n25, n50, n75, n100}   OPTIONAL,    -- Need OP
    },
    additionalSpectrumEmission          AdditionalSpectrumEmission
    },
    mbsfn-SubframeConfigList            MBSFN-SubframeConfigList                    OPTIONAL,    -- Need OR
    timeAlignmentTimerCommon            TimeAlignmentTimer,
    ...,
    lateNonCriticalExtension            OCTET STRING                                OPTIONAL,    -- Need OP
    [[ ssac-BarringForMMTEL-Voice-r9        AC-BarringConfig                            OPTIONAL,    -- Need OP
       ssac-BarringForMMTEL-Video-r9        AC-BarringConfig                            OPTIONAL     -- Need OP
    ]],
    [[ ac-BarringForCSFB-r10                AC-BarringConfig                            OPTIONAL     -- Need OP
    ]]
    [[ acdc-BarringForIMS-r11               ACDC-BarringConfig-r11                      OPTIONAL     -- Need OP
    ]]
}

ACDC-BarringConfig-r11 ::=          CHOICE{
    Barring                             AC-BarringConfig            OPTIONAL,
    no barring                          ENUMERATED(true)            OPTIONAL
}

AC-BarringConfig ::=                SEQUENCE {
    ac-BarringFactor                    ENUMERATED {
                                          p00, p05, p10, p15, p20, p25, p30, p40,
                                          p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE(5))
}

MBSFN-SubframeConfigList ::=        SEQUENCE (SIZE (1..maxMBSFN-Allocations)) OF MBSFN-SubframeConfig

-- ASN1STOP
```

FIG. 11

| SystemInformationBlockType2 field descriptions |
|---|
| ac-BarringFactor |
| If the random number drawn by the UE is lower than this value, access is allowed. Otherwise the access is barred. The values are interpreted in the range [0, 1): p00 = 0, p05 = 0.05, p10 = 0.10,...,p95 = 0.95. Values other than p00 can only be set if all bits of the corresponding ac-BarringForSpecialAC are set to 0. |
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/ leftmost bit is for AC 11, the second bit is for AC 12, and so on. |
| ac-BarringTime |
| Mean access barring time value in seconds. |
| additionalSpectrumEmission |
| The UE requirements related to IE AdditionalSpectrumEmission are defined in TS 36.101 [42, table 6.2.4.1]. |
| mbsfn-SubframeConfigList |
| Defines the subframes that are reserved for MBSFN in downlink. |
| ssac-BarringForMMTEL-Video |
| Service specific access class barring for MMTEL video originating calls. |
| ssac-BarringForMMTEL-Voice |
| Service specific access class barring for MMTEL voice originating calls. |
| acdc-BarringforIMS |
| Service specific access class barring for originating calls triggered by IMS based applications. |
| ul-Bandwidth |
| Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq |
| For FDD: If absent, the (default) value determined from the default TX-RX frequency separation defined in TS 36.101 [42, table 5.7.3-1] applies.<br>For TDD: This parameter is absent and it is equal to the downlink frequency. |

FIG. 12

SystemInformationBlockType2 information element

```
-- ASN1START

SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig              OPTIONAL,    -- Need OP
        ac-BarringForMO-Data               AC-BarringConfig              OPTIONAL,    -- Need OP
    }                                                                    OPTIONAL,    -- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA              OPTIONAL,    -- Need OP
        ul-Bandwidth                       ENUMERATED {n6, n15, n25, n50, n75, n100}  OPTIONAL,  -- Need OP
        additionalSpectrumEmission         AdditionalSpectrumEmission
    },
    mbsfn-SubframeConfigList           MBSFN-SubframeConfigList          OPTIONAL,    -- Need OR
    timeAlignmentTimerCommon           TimeAlignmentTimer,
    ...,
    lateNonCriticalExtension           OCTET STRING                      OPTIONAL,    -- Need OP
    [[ ssac-BarringForMMTEL-Voice-r9       AC-BarringConfig              OPTIONAL,    -- Need OP
       ssac-BarringForMMTEL-Video-r9       AC-BarringConfig              OPTIONAL,    -- Need OP
    ]],
    [[ ac-BarringForCSFB-r10               AC-BarringConfig              OPTIONAL     -- Need OP
    ]]
    [[ ssac-BarringForIMS-r11              AC-BarringConfig              OPTIONAL     -- Need OP
    ]]
    [[ acdc-NoBarring-r11                  ENUMERATED{true}
    ]]
}

AC-BarringConfig ::=    SEQUENCE {
    ac-BarringFactor        ENUMERATED {
                                p00, p05, p10, p15, p20, p25, p30, p40,
                                p50, p60, p70, p75, p80, p85, p90, p95},
    ac-BarringTime          ENUMERATED {s4, s8, s16, s32, s64, s128, s256, s512},
    ac-BarringForSpecialAC  BIT STRING (SIZE(5))
}

MBSFN-SubframeConfigList ::=  SEQUENCE (SIZE (1..maxMBSFN-Allocations)) OF MBSFN-SubframeConfig

-- ASN1STOP
```

FIG. 13

| SystemInformationBlockType2 field descriptions |
|---|
| *ac-BarringFactor*<br>If the random number drawn by the UE is lower than this value, access is allowed. Otherwise the access is barred. The values are interpreted in the range [,1): p00 = 0, p05 = 0.05, p10 = 0.10,...,p95 = 0.95. Values other than p00 can only be set if all bits of the corresponding *ac-BarringForSpecialAC* are set to 0. |
| *ac-BarringForCSFB*<br>Access class barring for mobile originating CS fallback. |
| *ac-BarringForEmergency*<br>Access class barring for AC 10. |
| *ac-BarringForMO-Data*<br>Access class barring for mobile originating calls. |
| *ac-BarringForMO-Signalling*<br>Access class barring for mobile originating signalling. |
| *ac-BarringForSpecialAC*<br>Access class barring for AC 11-15. The first/ leftmost bit is for AC 11, the second bit is for AC 12, and so on. |
| *ac-BarringTime*<br>Mean access barring time value in seconds. |
| *additionalSpectrumEmission*<br>The UE requirements related to IE *AdditionalSpectrumEmission* are defined in TS 36.101 [42, table 6.2.4.1]. |
| *mbsfn-SubframeConfigList*<br>Defines the subframes that are reserved for MBSFN in downlink. |
| *ssac-BarringForMMTEL-Video*<br>Service specific access class barring for MMTEL video originating calls. This IE can be used also for service specific access class barring of IMS based applications. (IMS粒度) |
| *ssac-BarringForMMTEL-Voice*<br>Service specific access class barring for MMTEL voice originating calls. This IE can be used also for service specific access class barring of IMS based applications. (IMS粒度) |
| *acdc-NoBarring*<br>Indicates that no barring for IMS based applications triggered originating calls. |
| *ssac-BarringforIMS*<br>Service specific access class barring for originating calls triggered by IMS based applications. |
| *ul-Bandwidth*<br>Parameter: transmission bandwidth configuration, N_RB, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| *ul-CarrierFreq*<br>For FDD: If absent, the (default) value determined from the default TX-RX frequency separation defined in TS 36.101 [42, table 5.7.3-1] applies.<br>For TDD: This parameter is absent and it is equal to the downlink frequency. |

FIG. 15

SystemInformationBlockType2 information element

```
-- ASN1START

SystemInformationBlockType2 ::=    SEQUENCE {
    ac-BarringInfo                 SEQUENCE {
        ac-BarringForEmergency         BOOLEAN,
        ac-BarringForMO-Signalling     AC-BarringConfig            OPTIONAL,   -- Need OP
        ac-BarringForMO-Data           AC-BarringConfig            OPTIONAL,   -- Need OP
    }                                                              OPTIONAL,   -- Need OP
    radioResourceConfigCommon      RadioResourceConfigCommonSIB,
    ue-TimersAndConstants          UE-TimersAndConstants,
    freqInfo                       SEQUENCE {
        ul-CarrierFreq                 ARFCN-ValueEUTRA                            OPTIONAL,   -- Need OP
        ul-Bandwidth                   ENUMERATED {n6, n15, n25, n50, n75, n100}   OPTIONAL,   -- Need OP
    },
    mbsfn-SubframeConfigList       MBSFN-SubframeConfigList    OPTIONAL,   -- Need OR
    timeAlignmentTimerCommon       TimeAlignmentTimer,
    ...,
    lateNonCriticalExtension       OCTET STRING                OPTIONAL,   -- Need OP
    [[ ssac-BarringForMMTEL-Voice-r9    AC-BarringConfig        OPTIONAL,   -- Need OP
       ssac-BarringForMMTEL-Video-r9    AC-BarringConfig        OPTIONAL,   -- Need OP
    ]],
    [[ ac-BarringForCSFB-r10            AC-BarringConfig        OPTIONAL    -- Need OP
    ]],
    [[ acdc-NWsupport                   ENUMERATED(true)        OPTIONAL    -- Need OP
       acdc-BarringForIMS-r11           AC-BarringConfig        OPTIONAL    -- Need OP
    ]]
}

AC-BarringConfig ::=    SEQUENCE {
    ac-BarringFactor            ENUMERATED {
                                    p00, p05, p10, p15, p20, p25, p30, p40,
                                    p50, p60, p70, p75, p80, p85, p90, p95},
    ac-BarringTime              ENUMERATED {s4, s8, s16, s32, s64, s128, s256, s512},
    ac-BarringForSpecialAC      BIT STRING (SIZE(5))
}

MBSFN-SubframeConfigList ::=    SEQUENCE (SIZE (1..maxMBSFN-Allocations)) OF MBSFN-SubframeConfig

-- ASN1STOP
```

FIG. 16

| SystemInformationBlockType2 field descriptions |
|---|
| ac-BarringFactor |
| If the random number drawn by the UE is lower than this value, access is allowed. Otherwise the access is barred. The values are interpreted in the range [0,1): p00 = 0, p05 = 0.05, p10 = 0.10,....,p95 = 0.95. Values other than p00 can only be set if all bits of the corresponding ac-BarringForSpecialAC are set to 0. |
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/ leftmost bit is for AC 11, the second bit is for AC 12, and so on. |
| ac-BarringTime |
| Mean access barring time value in seconds. |
| additionalSpectrumEmission |
| The UE requirements related to IE AdditionalSpectrumEmission are defined in TS 36.101 [42, table 6.2.4.1]. |
| mbsfn-SubframeConfigList |
| Defines the subframes that are reserved for MBSFN in downlink. |
| ssac-BarringForMMTEL-Video |
| Service specific access class barring for MMTEL video originating calls. |
| ssac-BarringForMMTEL-Voice |
| Service specific access class barring for MMTEL voice originating calls. |
| acdc-NWsupport |
| Indicates whether the network supports ACDC(IMS/VoLTE) barring. |
| acdc-BarringforIMS |
| Service specific access class barring for originating calls triggered by IMS based applications. |
| ul-Bandwidth |
| Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq |
| For FDD: If absent, the (default) value determined from the default TX-RX frequency separation defined in TS 36.101 [42, table 5.7.3-1] applies.<br>For TDD: This parameter is absent and it is equal to the downlink frequency. |

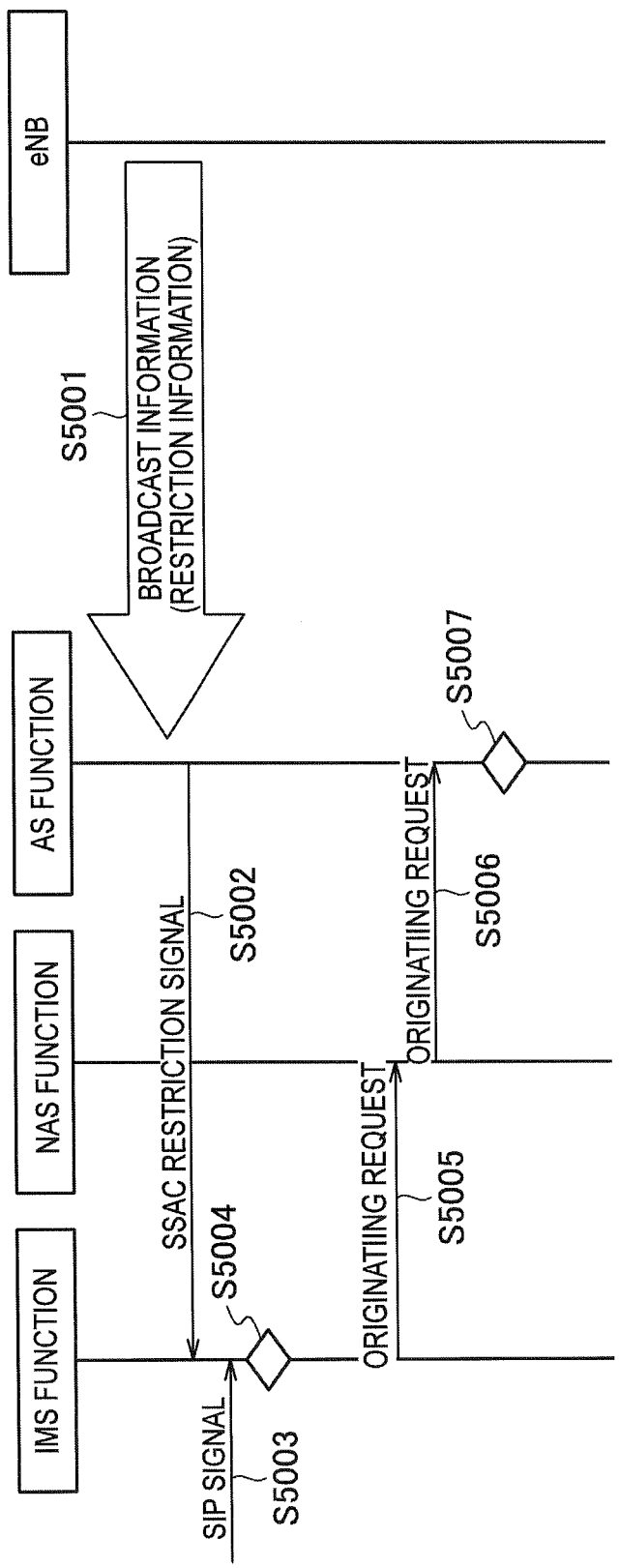

MOBILE STATION

TECHNICAL FIELD

The present invention relates to a mobile station.

BACKGROUND ART

A mobile station UE of the LTE (Long Term Evolution) is capable of restricting an IMS (IP Multimedia Subsystem) related call originating signal (hereinafter referred to as originating signal) by using SSAC (Service Specific Access Control).

For example, the IMS-related originating signal includes originating signals for an IMS service call, i.e., an originating signal for a voice call and an originating signal for a packet call (for example, a videophone call). A voice call in the LTE is referred to as a VoLTE call, and a videophone call in the LTE is referred to as a MMTEL video call.

PRIOR ART DOCUMENT

Non-Patent Document

Non-patent document 1: 3GPP TS36.331

SUMMARY OF THE INVENTION

However, the conventional LTE is configured to perform restriction control of determining whether or not to restrict transmission of an IMS-related originating signal by using SSAC.

Additionally, the conventional LTE is configured to perform restriction control of determining whether or not to restrict transmission of a packet call by using ACB (Access Class Barring).

Here, the SSAC is a restriction control in the IMS specified by LTE (release 9), and the ACB is a restriction control in the AS (Access Stratum) specified by LTE (Release 8).

Hereinafter, a restriction control according to the conventional LTE is described with reference to FIG. 17.

As shown in FIG. 17, the AS function of the mobile station UE receives, at Step S5001, broadcast information containing SSAC restriction information and ACB restriction information transmitted by the radio base station eNB, and transmits, at Step S5002, the SSAC restriction information contained in the received broadcast information to the IMS function.

Upon receiving a SIP (Session Initiation Protocol) signal as an originating signal for establishing an IMS service call (hereinafter, referred to as an INS-related originating signal) at Step S5003, the IMS function determines whether or not to permit transmission of the SIP signal according to the SSAC restriction information at Step S5004.

Here, the IMS service call includes an IMS voice call (VoLTE call) and an IMS video call.

Also, the SIP signal as an IMS-related originating signal includes "REGISTER (IMS Registration)", "INVITE (originating signal of IMS service call)", "MESSAGE (SMS)", "OPTION (setting system signal)", etc.

When determining to permit transmission of the SIP signal, the IMS function transmits an originating request to the NAS (Non-Access Stratum) function at Step S5005, and the NAS function transmits an originating request to the AS function at Step S5006.

Here, the NAS function assigns a call type indicating MO-Data in response to the originating request by the SIP signal, and transmits the originating request to the AS function.

At Step S5007, the AS function recognizes that the call type of the SIP signal is MO-Data according to the ACB restriction information, and determines whether or not to permit transmission of the SIP signal.

Here, the SSAC is configured to determine whether or not to permit transmission of the originating signal of the IMS service call according to the SSAC restriction information.

On the other hand, the ACB is configured to determine whether or not to permit transmission of any originating signals of all packet calls (including IMS service calls and other packet calls) by using the ACB restriction information.

In this way, the IMS service call whose transmission is once permitted by the SSAC is further processed through determination by the ACB on whether or not to permit the transmission thereof. That is, an originating signal of an IMS service call whose transmission is once permitted according to the restriction control of SSAC may be restricted by the ACB.

Probability of transmission permission by the ACB is configured to be specified by "ac-BarringFactor". However, "100%" cannot be set to "ac-BarringFactor".

In view of disaster situations in recent years, it is necessary to enable the voice call even by restricting the packet call.

As described above, however, the conventional restriction control in the LTE cannot provide a control of restricting transmission of an originating signal of a packet call, while not restricting transmission of an originating signal of a VoLTE call.

Thus, the present invention has been made in view of such circumstances and has an objective of providing a mobile station capable of performing restriction control independently from a packet call and a voice call.

A first feature of the present invention is summarized as a mobile station including: a specific application function; a NAS function; and an AS function. Here, the specific application function is configured to perform restriction control of determining whether or not to permit transmission of an originating signal relating to a specific application according to specific application restriction information broadcasted. The specific application function is configured to notify the NAS function of an originating request containing an identifier indicating an originating signal relating to a specific application, when determining to permit transmission of the originating signal relating to the specific application. The NAS function is configured to notify the AS function of an originating request containing an identifier indicating an originating signal relating to a specific application. The AS function is configured not to perform restriction control of determining whether or not to permit transmission of the originating signal relating to the specific application, in response to the notified originating request containing the identifier.

A second feature of the present invention is summarized as a mobile station including: a specific application function; a NAS function; and an AS function. The specific application function is configured to perform restriction control of determining whether or not to permit transmission of an originating signal of a specific service call in a specific application according to specific application restriction information broadcasted. The specific application function is configured to notify the NAS function of an originating request containing an identifier indicating an originating signal of a specific service call in a specific application, when determining to permit transmission of the originating signal of the specific service call. The NAS function is configured to transmit, to the AS function, an originating request containing an identifier indicating an originating signal of a specific service call in a specific application. The AS function is configured not to perform restriction control of determining whether or not to permit transmission of the originating signal of the specific service call, in response to the notified originating request containing the identifier.

A third feature of the present invention is summarized as a mobile station including: a specific application function; and an AS function. Here, when specific application restriction information is not broadcast and AS restriction information is broadcast, the specific application function is configured not to perform restriction control of determining whether or not to permit transmission of an originating signal of a specific application call or a specific service call in a specific application, and the AS function is configured to perform restriction control of determining whether or not to permit transmission of the originating signal of the specific application call or the specific service call according to the AS restriction information. When the specific application restriction information indicating performing no restriction is broadcast, the specific application function and the AS function are configured not to perform the restriction control even when the AS restriction information is broadcast.

A fourth feature of the present invention is summarized as a mobile station including: a specific application function; and an AS function. Here, when specific application restriction information is not broadcast, AS restriction information is broadcast, and a radio access network is notified to support a restriction control for a specific application call and a specific service call in a specific application, the specific application function and the AS function are configured not to perform restriction control of determining whether or not to permit transmission of an originating signal of the specific application call and the specific service call. When the specific application restriction information is not broadcast, the AS restriction information is broadcast, and the radio access network is not notified to support restriction control for the specific application call and the specific service call, the specific application function is configured not to perform the restriction control, and the AS function is configured to perform the restriction control.

BRIEF DESCRIPTION OF THE DRAWINGS

FIG. 5 is a diagram showing an example of a SIB2 used in the mobile communication system according to the first embodiment of the present invention.

FIG. 6 is a diagram showing an example of the SIB2 used in the mobile communication system according to the first embodiment of the present invention.

FIG. 7 is a diagram showing an example of the SIB2 used in the mobile communication system according to the first embodiment of the present invention.

FIG. 8 is a diagram showing an example of the SIB2 used in the mobile communication system according to the first embodiment of the present invention.

FIG. 10 is a diagram showing an example of a SIB2 used in a mobile communication system according to the second embodiment of the present invention.

FIG. 11 is diagram showing an example of the SIB2 used in the mobile communication system according to the second embodiment of the present invention.

FIG. 12 is a diagram showing an example of the SIB2 used in the mobile communication system according to the second embodiment of the present invention.

FIG. 13 is a diagram showing an example of the SIB2 used in the mobile communication system according to the second embodiment of the present invention.

FIG. 15 is a diagram showing an example of a SIB2 used in the mobile communication system according to the third embodiment of the present invention.

FIG. 16 is a diagram showing an example of the SIB2 used in the mobile communication system according to the third embodiment of the present invention.

FIG. 17 is a sequence diagram showing the operation of a conventional mobile communication system.

MODE FOR CARRYING OUT THE INVENTION (Mobile Station According to the First Embodiment of the Present Invention)

The mobile communication system according to the first embodiment of the present invention is described with reference to FIGS. 1 to 8. The mobile communication system according to this embodiment supports the LTE.

Figure 1:
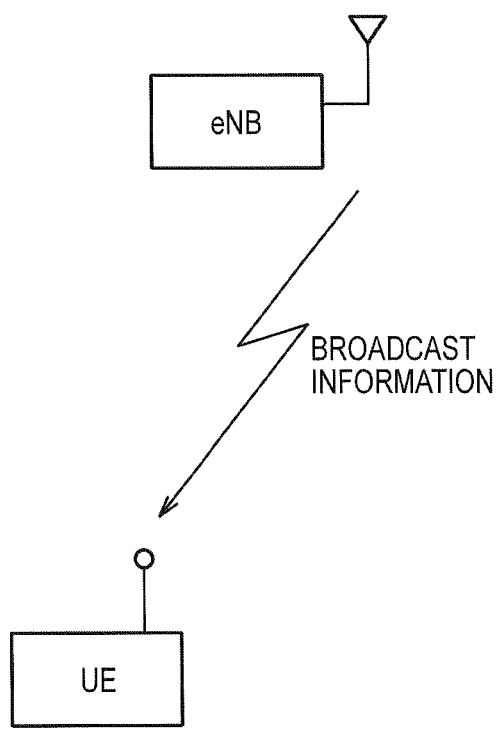
FIG. 1 is an overall configuration diagram of a mobile communication system according to a first embodiment of the present invention.

As shown in FIG. 1, a radio base station eNB in the mobile communication system according to this embodiment is configured to transmit broadcast information such as MIB (Master Information Block), SIB (Master Information Block), etc., in cells under control thereof.

Figure 2:
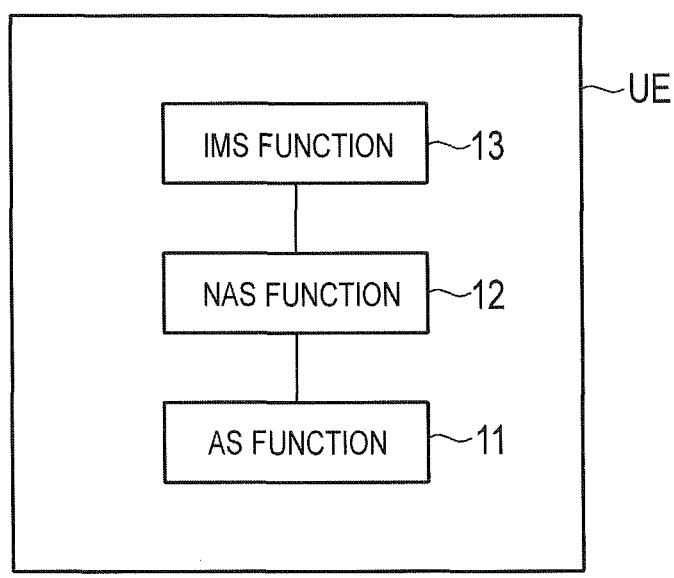
FIG. 2 is a functional block diagram of a mobile station according to the first embodiment of the present invention.

A mobile station UE according to this embodiment supports the LTE Release 11 and later versions, and comprises an AS function 11, a NAS function 12, and an IMS function 13, as shown in FIG. 2.

The AS function 11 is configured to perform various processing in an AS layer. The NAS function 12 is configured to perform various processing in a NAS layer. The IMS function 13 is configured to perform various processing in an IMS layer.

Although this specification describes about a scenario in which the IMS function 13 is used as a specific application function, the present invention also can be applied to scenarios where other application functions are used as a specific application function.

Here, the AS function 11 is configured to perform ACB according to the ACB restriction information at a timing when "RRC Connection Request" or "Service Request" is transmitted.

Similarly, the IMS function 13 is configured to perform SSAC according to the SSAC restriction information.

Hereinafter, restriction control in the mobile communication system according to this embodiment is described with reference to FIGS. 3 to 8. Specifically, a first example of the restriction control in the mobile communication system according to this embodiment is shown in FIG. 3, and a second example of the restriction control in the mobile communication system according to this embodiment is shown in FIG. 4.

Figure 3:
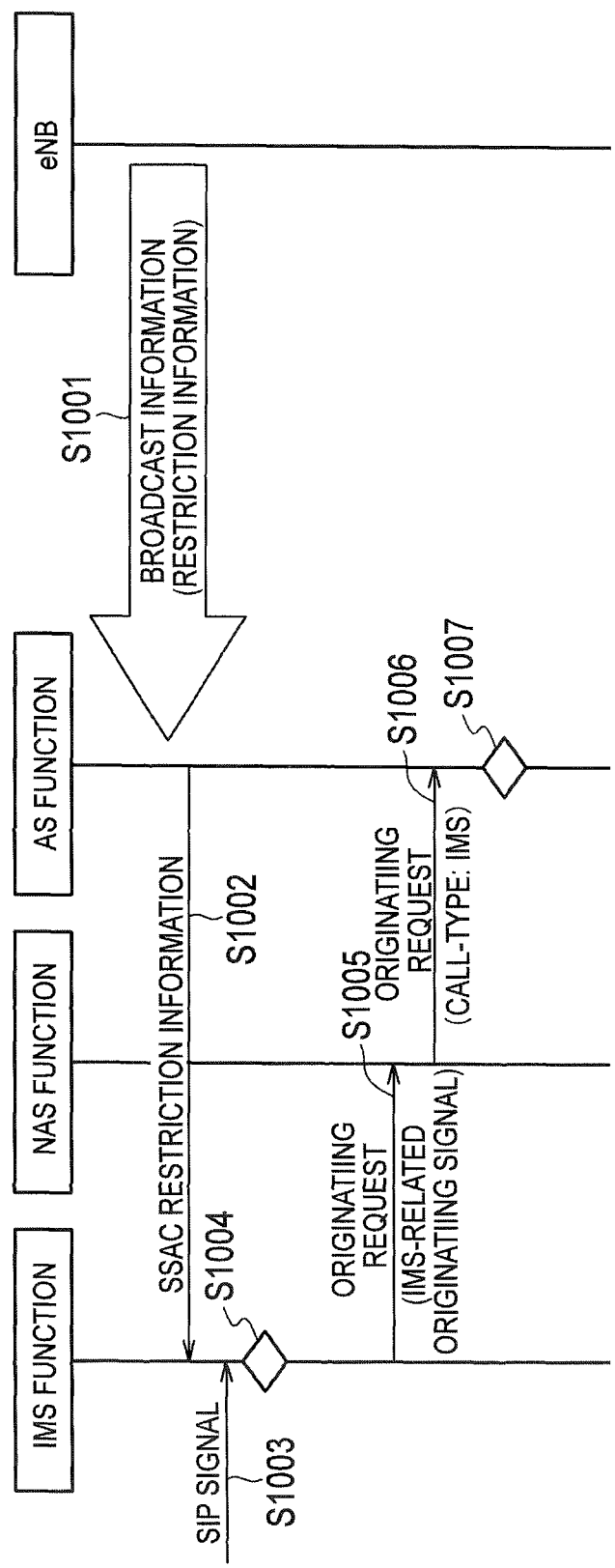
FIG. 3 is a sequence diagram showing the operation of the mobile communication system according to the first embodiment of the present invention.
Figure 4:
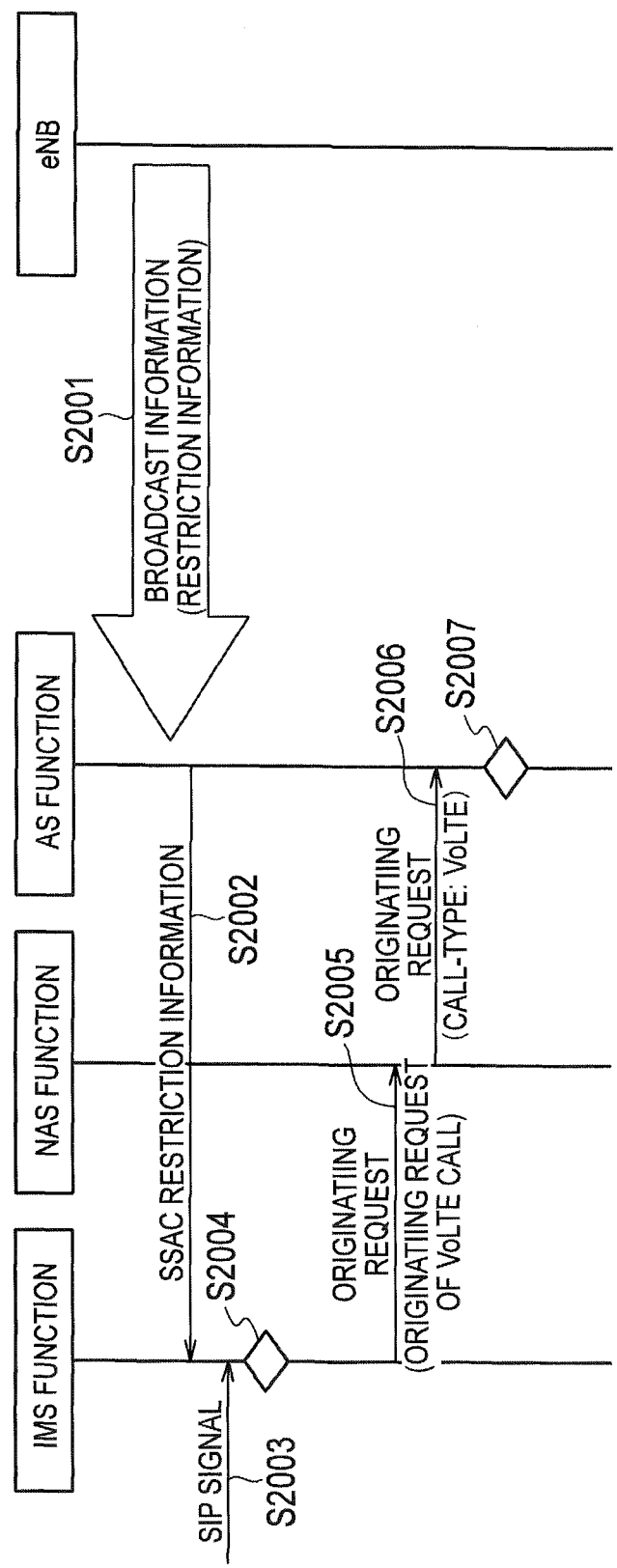
FIG. 4 is a sequence diagram showing the operation of the mobile communication system according to the first embodiment of the present invention.

Firstly, as shown in FIG. 3, the AS function 11 of the mobile station UE receives, at Step S1001, broadcast information transmitted by the radio base station eNB, and transmits, at Step S1002, SSAC restriction information contained in the received broadcast information to the INS function 13.

Upon receiving the SIP signal as an INS-related originating signal at Step S1003, the IMS function 13 determines whether or not to permit transmission of the SIP signal as the INS-related originating signal according to the SSAC restriction information at Step S1004.

When determining to permit transmission of the INS-related originating signal, the IMS function 13 transmits, at Step S1005, an originating request containing an identifier indicating the INS-related originating signal to the NAS function 12.

At Step S1006, the NAS function 12 transmits an originating request containing "Call-Type: INS" as an identifier indicating the INS-related originating signal to the AS function 11.

At Step S1007, if the received originating request contains "Call-Type: INS", the AS function 11 transmits the INS-related originating signal without performing ACB thereon.

Here, the NAS function 12 may use a predetermined bit set to "1" as the above identifier in place of "Call-Type: IMS".

Secondly, as shown in FIG. 4, the AS function 11 of the mobile station UE receives, at Step S2001, broadcast information transmitted by the radio base station eNB, and transmits, at Step S2002, SSAC restriction information for a specific service call in the IMS contained in the received broadcast information to the IMS function 13.

Here, the specific service call is supposed to be a VoLTE call, a videophone call, a SMS over IP/RCS (presence service) call, etc.

The SSAC restriction information for a specific service call may be configured, as shown in FIGS. 5 and 6, so as to be set in an information element "ssac-BarringForIMS-rll" newly defined in the SIB2, or in an existing information element in the SIB2 such as "ssac-BarringForMMTEL-Video" and "ssac-BarringForMMTEL-Voice", as shown in FIGS. 7 and 8.

Upon receiving the originating signal of the above specific service call such as, for example, "INVITE" as an originating signal for the VoLTE call at Step S2003, the IMS function 13 determines whether or not to permit transmission of the "INVITE" according to the SSAC restriction information for the above specific service call at Step S2004.

When determining to permit transmission of the "INVITE", the IMS function 13 transmits, to the NAS function 12 at Step S2005, an originating request containing an identifier indicating an originating signal for a specific service call in the IMS, such as, for example, an originating signal of the VoLTE call.

At Step S2006, the NAS function 12 transmits an originating request containing "Call-Type: VoLTE" as an identifier indicating the originating signal of the VoLTE call to the AS function 11.

At Step S2007, when the received originating request contains "Call-Type: VoLTE", the AS function 11 transmits the "INVITE" without performing ACB to the originating signal of the VoLTE call.

Here, the NAS function 12 may use a predetermined bit set to "1" as the above identifier in place of "Call-Type: VoLTE".

According to an aspect of this embodiment, the AS function may transmit an IMS-related originating signal whose transmission is permitted by the IMS function 13, without performing ACB.

As a result, restriction control of a voice call such as the packet call and the VoLTE call can be performed independently. This enables control of restricting transmission of the packet call can be restricted while not restricting transmission of a voice call such as the VoLTE call.

(Mobile Communication System According to the Second Embodiment of the Present Invention)

The mobile communication system according to the second embodiment of the present invention is described with reference to FIGS. 9 to 13. Hereinafter, the mobile communication system according to the second embodiment of the present invention is described by focusing on differences thereof from the mobile communication system according to the first embodiment described above.

Figure 9:
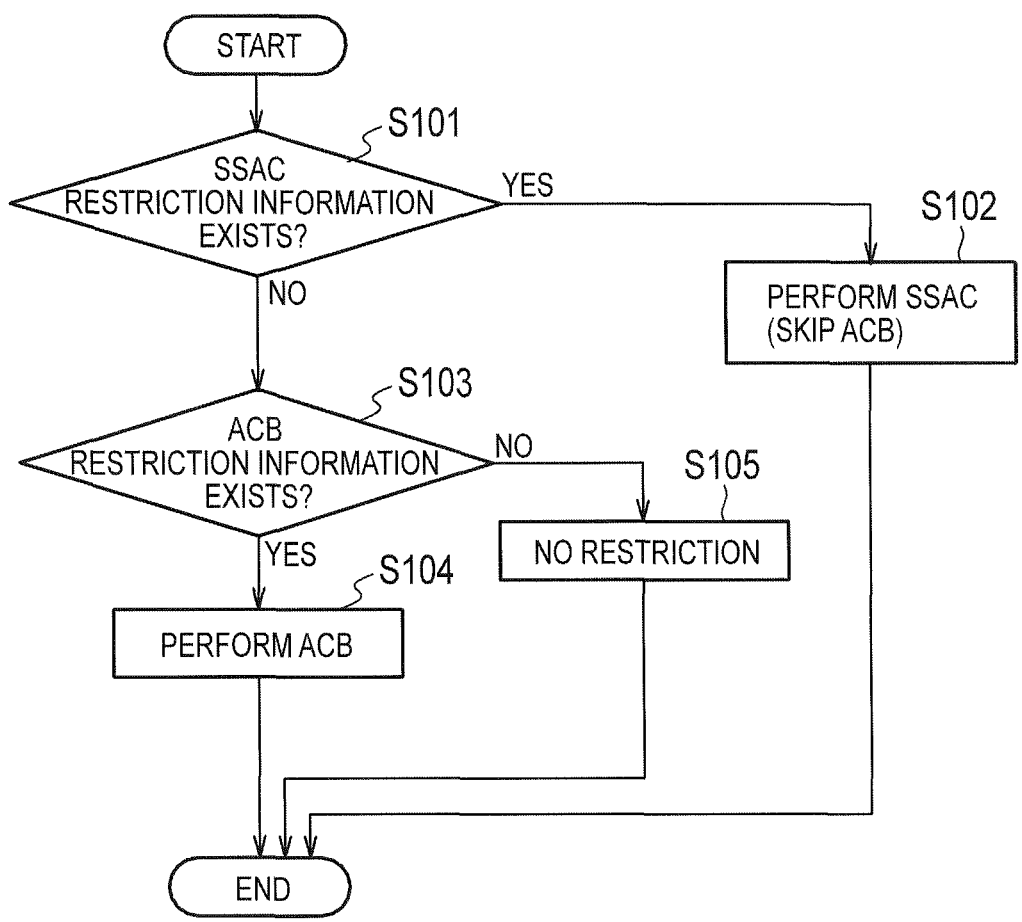
FIG. 9 is a flowchart showing the operation of a mobile station according to a second embodiment of the present invention.

As shown in FIG. 9, at Step S101, the AS function 11 and the IMS function 13 of the mobile station UE determine whether or not SSAC restriction information is contained in broadcast information (specifically, SIB2) received from the radio base station eNB.

If "YES", the operation proceeds to the step S102. If "NO", the operation proceeds to the step S103.

At Step S102, the IMS function 13 performs SSAC according to the SSAC restriction information, and the AS function 11 performs no ACS even when the ACB restriction information is broadcast.

Here, when the SSAC restriction information indicates "performing no restriction", or when the SSAC restriction ratio is "0%", the INS function 13 performs no SSAC.

For example, as shown in FIGS. 10 and 11, when "true" is set to "no barring" in an information element "ACDC-BarringConfig-r11" established in an information element "acdc-BarringForIMS-r11" newly defined in SIB2, the AS function 11 and the IMS function 13 determine that the SSAC restriction information indicates "performing no restriction", or that the SSAC restriction ratio is "0%".

Alternatively, as shown in FIGS. 12 and 13, when "true" is set to the information element "acdc-NoBarring-r11" in SIB2, the AS function 11 and the IMS function 13 determine that the SSAC restriction information indicates that "performing no restriction", or that the SSAC restriction ratio is "0%".

At Step S103, the AS function 11 determines whether or not the ACB restriction information is contained in the broadcast information (specifically, SIB2) received from the radio base station eNB.

If "YES", the operation proceeds to the step S104. If "NO", the operation proceeds to the step S105.

At Step S104, the AS function 11 performs ACB according to the ACB restriction information.

At Step S105, both the IMS function 13 and the AS function 11 perform no restriction control.

In the mobile communication system according to this embodiment, the mobile station UE can perform restriction control independently from a voice call such as the packet call and the VoLTE call even when a radio access network of the LTE Release 10 or older and a radio access network of the LTE Release 11 or later co-exist. This enables the mobile station UE to perform control of restricting transmission of the packet call while not restricting transmission of a voice call such as the VoLTE call.

It is assumed that the SSAC restriction information for a voice call such as the VoLTE call cannot be transmitted in a radio access network of the LTE Release 10 or older, and the SSAC restriction information for a voice call such the VoLTE call is always transmitted in a radio access network of the LTE Release 11 or later.

(Mobile Communication System According to the Third Embodiment of the Present Invention)

The mobile communication system according to the third embodiment of the present invention is described with reference to FIGS. 14 to 16. Hereinafter, the mobile communication system according to the third embodiment of the present invention is described by focusing on differences thereof from mobile communication systems according to the first and second embodiments described above.

Figure 14:
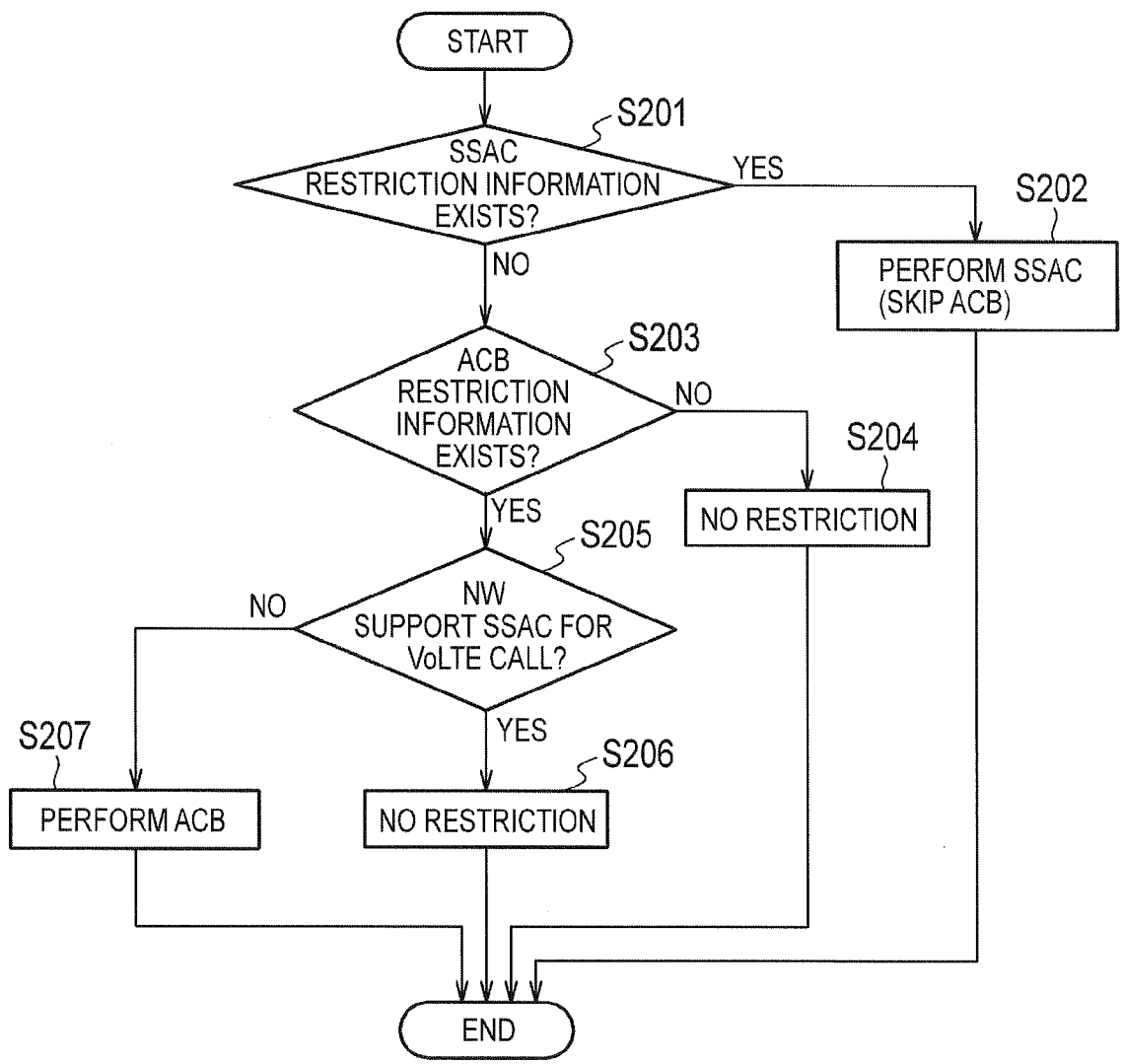
FIG. 14 is a flowchart showing the operation of a mobile station according to a third embodiment of the present invention.

As shown in FIG. 14, at Step S201, the AS function 11 and the IMS function 13 of the mobile station UE determine whether or not SSAC restriction information is contained in broadcast information (specifically, SIB2) received from the radio base station eNB.

If "YES", the operation proceeds to the step S202. If "NO", the operation proceeds to the step S203.

At Step S202, the IMS function 13 performs SSAC according to the SSAC restriction information, and the AS function 11 performs no ACB even when the ACB restriction information is broadcast.

At Step S203, the AS function 11 determines whether or not the ACB restriction information is contained in the broadcast information (specifically, SIB2) received from the radio base station eNB.

If "YES", the operation proceeds to the step S205. If "NO", the operation proceeds to the step S204.

At Step S204, both the IMS function 13 and the AS function 11 perform no restriction control.

At Step S205, the AS function 11 determines whether or not the radio access network is notified to support SSAC for a voice call such as the VoLTE call.

For example, as shown in FIGS. 15 and 16, when "true" is set to an information element "acdc-NWsupport" in SIB2, the AS function 11 may determine that the radio access network supports SSAC for a voice call such as the VoLTE call, and when "true" is not set to the information element "acdc-NWsupport" in SIB2, the AS function 11 may determine that the radio access network does not support a voice call such as the VoLTE call.

Here, when "true" is set to the information element "acdc-NWsupport" in SIB2, but not to "acdc-BarringForIMS-r11", or "ssac-BarringForMMTEL-Voice-r9", or "ssac-BarringForMMTEL-Video-r9", the above SSAC restriction information or the SSAC restriction ratio may be configured to indicate "0%".

If "YES", the operation proceeds to the step S206. If "NO", the operation proceeds to the step S207.

At Step S206, both the IMS function 13 and the AS function 11 perform no restriction control.

At Step S207, the AS function 11 performs ACB according to the ACB restriction information.

In the mobile communication system according to this embodiment, the mobile station UE can perform restriction control independently from a voice call such as the packet call and the VoLTE call even when a radio access network of a LTE Release 10 or older and a radio access network of a LTE Release 11 or later co-exist. This enables the mobile station UE to perform control of restricting transmission of the packet call, while not restricting transmission of a voice call such as the VoLTE call.

It is assumed that a radio access network of a LTE Release 10 or older does not support SSAC for a voice call such as the VoLTE call and provides no notification as to whether it supports SSAC for a voice call such as the VoLTE call, and a radio access network of a LTE Release 11 or later provides notification as to whether it supports SSAC for a voice call such as the VoLTE call.

The features of the present invention may also be expressed as follows.

A first feature of the present invention is summarized as a mobile station LIE including: an IMS function 13 (a specific application function); a NAS function 12; and an AS function 11. Here, the IMS function 13 is configured to perform SSAC (restriction control) of determining whether or not to permit transmission of an IMS-related originating signal (an originating signal relating to a specific application) according to SSAC restriction information (specific application restriction information) broadcasted. The IMS function 13 is configured to notify the NAS function 12 of an originating request containing an identifier indicating an IMS-related originating signal, when determining to permit transmission of the IMS-related originating signal. The NAS function 12 is configured to notify the AS function 11 of an originating request containing an identifier indicating an IMS-related originating signal. The AS function 11 is configured not to perform ACB (restriction control) of determining whether or not to permit transmission of the IMS-related originating signal, in response to the notified originating request containing the identifier.

A second feature of the present invention is summarized as a mobile station UE including: an IMS function 13; a NAS function 12; and an AS function 11. Here, the IMS function 13 is configured to perform SSAC of determining whether or not to permit transmission of an originating signal of a VoLTE (a specific service) call in an IMS according to SSAC restriction information broadcasted. The IMS function 13 is configured to notify the NAS function 12 of an originating request containing an identifier indicating an originating signal of a VoLTE call, when determining to permit transmission of the originating signal of the VoLTE call. The NAS function 12 is configured to transmit, to the AS function 11, an originating request containing an identifier indicating an originating signal of a VoLTE call. The AS function 11 is configured not to perform ACB of determining whether or not to permit transmission of the originating signal of the VoLTE call, in response to the notified originating request containing the identifier.

A third feature of the present invention is summarized as a mobile station UE including: an IMS function 13; and an AS function 11. When SSAC restriction information is not broadcast and ACB restriction information (AS restriction information) is broadcast, the IMS function 13 is configured not to perform SSAC of determining whether or not to permit transmission of an originating signal of an IMS service call or a VoLTE call, and the AS function 11 is configured to perform ACB of determining whether or not to permit transmission of the originating signal of the IMS service call (specific application call) or the VoLTE call according to the ACB restriction information. When the SSAC restriction information indicating performing no restriction is broadcast, the IMS function 13 and the AS function 11 are configured not to perform SSAC and ACB even when the ACB restriction information is broadcast.

A fourth feature of the present invention is summarized as a mobile station UE including: an IMS function 13; and an AS function 11. Here, when SSAC restriction information is not broadcast, ACB restriction information is broadcast, and a radio access network is notified to support SSAC for a voice call such as the VoLTE call, the IMS function 13 and the AS function 11 are configured not to perform SSAC and ACB of determining whether or not to permit transmission of an originating signal of an IMS service call or the VoLTE service call. When the SSAC restriction information is not broadcast, the ACB restriction information is broadcast, and the radio access network is not notified to support SSAC for the voice call such as the VoLTE call, the IMS function 13 is configured not to perform SSAC, and the AS function 11 is configured to perform ACB.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-106010 (filed on May 7, 2012) is incorporated by reference in the present specification.

INDUSTRIAL APPLICABILITY

As described above, the present invention provides a mobile station capable of independently performing restriction control on a packet call and a voice call.

EXPLANATION OF THE REFERENCE NUMERALS

UE mobile station
11 AS function
12 NAS function
13 IMS function

The invention claimed is:
1. A mobile station comprising:
a specific application function;
a NAS (Non-Access Stratum) function; and
an AS (Access Stratum) function, wherein
the specific application function is configured to perform restriction control of determining whether or not to permit transmission of an originating signal relating to a specific application according to specific application restriction information broadcasted;
the specific application function is configured to notify the NAS function of an originating request containing an identifier indicating an originating signal relating to a specific application, when determining to permit transmission of the originating signal relating to the specific application;
the NAS function is configured to notify the AS function of an originating request containing an identifier indicating an originating signal relating to a specific application; and
wherein the AS function is configured not to perform restriction control of determining whether or not to permit transmission of the originating signal relating to the specific application, in response to the notified originating request containing the identifier.

2. A mobile station comprising:
a specific application function;
a NAS (Non-Access Stratum) function; and
an AS (Access Stratum) function, wherein
the specific application function is configured to perform restriction control of determining whether or not to permit transmission of an originating signal of a specific service call in a specific application according to specific application restriction information broadcasted;
the specific application function is configured to notify the NAS function of an originating request containing an identifier indicating an originating signal of a specific service call in a specific application, when determining to permit transmission of the originating signal of the specific service call;
the NAS function is configured to transmit, to the AS function, an originating request containing an identifier indicating an originating signal of a specific service call in a specific application; and
the AS function is configured not to perform restriction control of determining whether or not to permit transmission of the originating signal of the specific service call, in response to the notified originating request containing the identifier.

3. A mobile station comprising:
a specific application function; and
an AS (Access Stratum) function, wherein
when specific application restriction information is not broadcast and AS restriction information is broadcast, the specific application function is configured not to perform restriction control of determining whether or not to permit transmission of an originating signal of a specific application call or a specific service call in a specific application, and the AS function is configured to perform restriction control of determining whether or not to permit transmission of the originating signal of the specific application call or the specific service call according to the AS restriction information; and
when the specific application restriction information indicating performing no restriction is broadcast, the specific application function and the AS function are configured not to perform the restriction control even when the AS restriction information is broadcast.

4. A mobile station comprising:
a specific application function; and an AS (Access Stratum) function, wherein when specific application restriction information is not broadcast, AS restriction information is broadcast, and a radio access network is notified to support a restriction control for a specific application call and a specific service call in a specific application, the specific application function and the AS function are configured not to perform restriction control of determining whether or not to permit transmission of an originating signal of the specific application call and the specific service call; and when the specific application restriction information is not broadcast, the AS restriction information is broadcast, and the radio access network is not notified to support restriction control for the specific application call and the specific service call, the specific application function is configured not to perform the restriction control, and the AS function is configured to perform the restriction control.

* * * * *